(12) United States Patent　　　　(10) Patent No.:　US 12,564,801 B2
Boutin et al.　　　　　　　　　　　　(45) Date of Patent:　Mar. 3, 2026

(54) OIL FILTER WITH TWO FILTRATE OUTLETS AND VEHICLE LUBRICATION CIRCUIT

(71) Applicant: VOLVO TRUCK CORPORATION, Gothenburg (SE)

(72) Inventors: Baptiste Boutin, La Tour du Pin (FR); Nicolas Granottier, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 360 days.

(21) Appl. No.: 18/550,597

(22) PCT Filed: Mar. 18, 2021

(86) PCT No.: PCT/EP2021/057018
§ 371 (c)(1),
(2) Date: Sep. 14, 2023

(87) PCT Pub. No.: WO2022/194382
PCT Pub. Date: Sep. 22, 2022

(65) Prior Publication Data
US 2024/0149192 A1　　May 9, 2024

(51) Int. Cl.
*B01D 29/15*　　　(2006.01)
*B01D 29/92*　　　(2006.01)

(52) U.S. Cl.
CPC ............. *B01D 29/15* (2013.01); *B01D 29/92* (2013.01); *B01D 2201/165* (2013.01)

(58) Field of Classification Search
None
See application file for complete search history.

(56) References Cited

U.S. PATENT DOCUMENTS

| 2,031,935 | A | * | 2/1936 | Cuno | ................... | B01D 27/005 |
| | | | | | | 210/240 |
| 2,271,054 | A | * | 1/1942 | Williams | ............... | B01D 27/02 |
| | | | | | | 210/342 |
| 2,893,514 | A | * | 7/1959 | Badertscher | ............. | F01M 1/10 |
| | | | | | | 184/6.24 |
| 2,929,506 | A | * | 3/1960 | Belgarde | ............... | B01D 29/50 |
| | | | | | | 210/315 |

(Continued)

FOREIGN PATENT DOCUMENTS

| DE | 102011077712 A1 | 12/2012 |
| DE | 102019203903 A1 | 9/2020 |

(Continued)

OTHER PUBLICATIONS

International Search Report and Written Opinion in corresponding International Application No. PCT/EP2021/057018 mailed Nov. 18, 2021 (11 pages).

*Primary Examiner* — Robert J Popovics

(74) *Attorney, Agent, or Firm* — Jeffri A. Kaminski; Venable LLP

(57) ABSTRACT

An oil filter for vehicle lubrication system includes a housing forming a cavity, a filter medium mounted in the housing cavity, an inlet port located upstream of the filter medium in the direction of oil flow, a first outlet port located downstream of the filter medium. The oil filter includes a second outlet port located downstream of the filter medium.

10 Claims, 1 Drawing Sheet

(56)        References Cited

U.S. PATENT DOCUMENTS

| | | | | |
|---|---|---|---|---|
| 3,482,696 | A * | 12/1969 | Jones, Jr. | F15C 1/008 |
| | | | | 210/90 |
| 3,741,342 | A * | 6/1973 | Maddalozzo | F01M 5/002 |
| | | | | 184/6.24 |
| 4,193,442 | A * | 3/1980 | Vian | F01P 7/16 |
| | | | | 123/196 AB |
| 4,452,695 | A * | 6/1984 | Schmidt | B01D 27/103 |
| | | | | 285/190 |
| 4,531,485 | A * | 7/1985 | Murther | F01M 1/20 |
| | | | | 123/198 C |
| 4,648,363 | A * | 3/1987 | Kronich | F01M 1/10 |
| | | | | 123/198 C |
| 4,700,670 | A * | 10/1987 | Schade | B01D 35/147 |
| | | | | 210/167.02 |
| 4,738,776 | A * | 4/1988 | Brown | F01M 11/03 |
| | | | | 210/DIG. 17 |
| 4,976,854 | A * | 12/1990 | Yano | B01D 36/001 |
| | | | | 210/167.04 |
| 4,997,556 | A * | 3/1991 | Yano | F01M 11/03 |
| | | | | 210/167.04 |
| 5,000,143 | A * | 3/1991 | Brown | F01M 1/12 |
| | | | | 123/196 S |
| 5,078,877 | A * | 1/1992 | Cudaback | B01D 27/06 |
| | | | | 210/DIG. 17 |
| 5,180,490 | A * | 1/1993 | Eihusen | B01D 27/08 |
| | | | | 210/DIG. 17 |
| 5,246,086 | A * | 9/1993 | Yunick | F01M 11/0458 |
| | | | | 184/105.3 |
| 5,342,511 | A * | 8/1994 | Brown | B01D 27/06 |
| | | | | 210/450 |
| 5,351,664 | A * | 10/1994 | Rotter | F16H 57/0415 |
| | | | | 123/196 AB |
| 5,510,023 | A * | 4/1996 | Taylor | B01D 35/185 |
| | | | | 210/473 |
| 5,511,522 | A * | 4/1996 | Tran | F01M 5/025 |
| | | | | 184/6.3 |
| 5,566,781 | A * | 10/1996 | Robert | F16N 33/00 |
| | | | | 134/22.12 |
| 5,653,206 | A * | 8/1997 | Spurgin | F01M 5/002 |
| | | | | 123/196 AB |
| 5,718,281 | A * | 2/1998 | Bartalone | F01P 11/029 |
| | | | | 165/41 |
| 5,743,231 | A * | 4/1998 | Reinosa | F01M 5/025 |
| | | | | 123/196 S |
| 5,814,215 | A * | 9/1998 | Bruss | B01D 35/147 |
| | | | | 210/429 |
| 5,884,601 | A * | 3/1999 | Robinson | F01M 1/16 |
| | | | | 123/196 S |
| 5,887,561 | A * | 3/1999 | Spurgin | B62K 11/04 |
| | | | | 123/196 AB |
| 5,887,562 | A * | 3/1999 | von Esebeck | F01M 1/12 |
| | | | | 123/196 R |
| 5,988,265 | A * | 11/1999 | Marthaler | F01P 11/06 |
| | | | | 123/41.31 |
| 6,263,962 | B1 * | 7/2001 | Komoda | B01D 35/306 |
| | | | | 123/196 AB |
| 6,270,659 | B1 * | 8/2001 | Bagci | B01D 35/26 |
| | | | | 210/111 |
| 6,595,371 | B1 * | 7/2003 | Desmarais | B01D 27/08 |
| | | | | 210/450 |
| 6,708,665 | B1 * | 3/2004 | Lehmann | F16H 57/0415 |
| | | | | 123/196 R |
| 6,941,922 | B2 * | 9/2005 | Williams | F01M 5/002 |
| | | | | 123/196 R |
| 6,994,784 | B2 * | 2/2006 | Jainek | B01D 35/147 |
| | | | | 210/DIG. 17 |
| 7,048,848 | B2 * | 5/2006 | Assion | B01D 27/148 |
| | | | | 210/DIG. 17 |
| 7,056,442 | B2 * | 6/2006 | Hansen | F01P 11/06 |
| | | | | 134/22.12 |
| 7,396,473 | B1 * | 7/2008 | Guynn | B01D 35/185 |
| | | | | 210/DIG. 17 |
| 7,458,468 | B2 * | 12/2008 | Desmarais | B01D 27/06 |
| | | | | 210/441 |
| 7,510,662 | B1 * | 3/2009 | Hansen | F01P 11/06 |
| | | | | 134/22.12 |
| 7,992,667 | B2 * | 8/2011 | Rennie | F01M 11/03 |
| | | | | 210/167.04 |
| 8,057,687 | B2 * | 11/2011 | Jainek | B01D 35/18 |
| | | | | 210/DIG. 17 |
| 8,231,793 | B2 * | 7/2012 | Hacker | B01D 29/15 |
| | | | | 210/167.04 |
| 8,377,295 | B2 * | 2/2013 | Strassenberger | B01D 35/30 |
| | | | | 210/186 |
| 8,469,083 | B2 * | 6/2013 | Jainek | F28F 27/02 |
| | | | | 210/175 |
| 8,911,620 | B2 * | 12/2014 | Silegren | B01D 35/18 |
| | | | | 123/196 AB |
| 9,314,725 | B2 * | 4/2016 | Kaiser | F01N 3/303 |
| 9,707,498 | B2 * | 7/2017 | Hampton | B01D 29/50 |
| 9,976,645 | B2 * | 5/2018 | Gooden | F16H 57/0475 |
| 10,113,456 | B2 * | 10/2018 | Lee | F01M 11/02 |
| 10,145,275 | B2 * | 12/2018 | Saito | F01M 11/03 |
| 10,300,411 | B2 * | 5/2019 | Hampton | B01D 29/114 |
| 10,905,973 | B2 * | 2/2021 | Jensen | F16N 39/06 |
| 11,098,621 | B2 * | 8/2021 | Tilbury | F01M 11/0408 |
| 11,242,019 | B2 * | 2/2022 | Parrish | B60R 17/02 |
| 11,471,795 | B2 * | 10/2022 | Stausberg | F15B 21/041 |
| 12,059,642 | B1 * | 8/2024 | Lin | B01D 35/18 |
| 12,320,279 | B1 * | 6/2025 | Li | F01M 5/002 |
| 2004/0182566 | A1 * | 9/2004 | Jainek | B01D 35/16 |
| | | | | 165/300 |
| 2005/0023200 | A1 * | 2/2005 | Ueshima | F01M 5/002 |
| | | | | 210/171 |
| 2008/0035544 | A1 * | 2/2008 | Rennie | F01M 11/03 |
| | | | | 210/167.04 |
| 2011/0297119 | A1 | 12/2011 | Huhn et al. | |
| 2014/0260136 | A1 * | 9/2014 | Kaiser | F01N 3/303 |
| | | | | 55/476 |
| 2015/0159774 | A1 * | 6/2015 | Kim | F01M 5/007 |
| | | | | 236/94 |
| 2015/0330273 | A1 * | 11/2015 | Chung | F01M 11/10 |
| | | | | 701/34.4 |
| 2017/0167330 | A1 * | 6/2017 | Lee | F01M 5/007 |
| 2024/0149192 | A1 * | 5/2024 | Boutin | B01D 29/15 |

FOREIGN PATENT DOCUMENTS

| | | | | |
|---|---|---|---|---|
| GB | 2164395 | A | 3/1986 | |
| JP | 2005246253 | A | 9/2005 | |
| WO | WO-2022194382 | A1 * | 9/2022 | B01D 29/15 |

* cited by examiner

OIL FILTER WITH TWO FILTRATE OUTLETS AND VEHICLE LUBRICATION CIRCUIT

CROSS-REFERENCE TO RELATED APPLICATIONS

This application is a U.S. National Stage application of PCT/EP2021/057018, filed Mar. 18, 2021 and published on Sep. 22, 2022, as WO 2022/194382, all of which is hereby incorporated by reference in its entirety.

TECHNICAL FIELD

The invention relates to an oil filter, lubrication circuit including this filter and vehicle equipped with the lubrication circuit.

The invention can be applied in heavy-duty and/or medium vehicles, such as trucks, buses and construction equipment. The invention also can be applied to car.

The invention is applicable on working machines within the fields of industrial construction machines or construction equipment, in particular wheel loaders. The invention is not restricted to this particular machine but may also be used in other working machines such as articulated haulers, excavators and backhoe loaders.

BACKGROUND

The oil filter is an essential element for vehicle lubrication systems. It eliminates impurities or particles present in the oil that could damage the vehicle's mechanical components. The emergence of hybrid vehicles with more complex transmissions incorporating electric motors makes lubrication systems more complex, particularly because of the greater need to cool the oil. Current filters require the use of more circuits and connections. US20110297119 describes such a lubrication circuit.

SUMMARY

The first object of the invention is to provide an oil filter for vehicle lubrication system requesting a simpler oil circuit architecture.

The object is achieved by an oil filter for vehicle lubrication system comprising a housing forming a cavity, a filter medium mounted in the housing cavity, an inlet port located upstream of the filter medium in the direction of oil flow, a first outlet port located downstream of the filter medium, characterised in that the filter comprises a second outlet port located downstream of the filter medium.

Using two distinct outlets allow to reduce the number of connexion and/or the length of the circuit.

According to one embodiment, the housing is cylindrical.

According to one embodiment, the axis of the first outlet orifice is parallel to the longitudinal axis of the cylinder forming the casing.

According to one embodiment, axis of the second orifice is sequential with at least the longitudinal axis of the cylinder forming the casing.

According to one embodiment, axis of the first outlet port is coincident with the axis of the cylinder forming the casing.

According to one embodiment, the first and second ports are connected.

According to one embodiment, axis of the first port is perpendicular to the axis of the second port.

The second object of the invention is to provide vehicle lubrication system using the oil filter according to the first object of the invention.

The object is achieved by a lubrication circuit of a motor vehicle comprising a pump, an exchanger for cooling the oil of the circuit, a by-pass circuit of the exchanger characterised in that the circuit comprises an oil filter according to one of the preceding claims.

According to one embodiment, the first outlet port is connected to the pump inlet, the second port is connected to the exchanger inlet.

According to one embodiment, the lubrication circuit according comprises a 3-way valve, a first inlet of the 3-way valve is connected the second first port of the filter, a second inlet of the 3-way valve is connected to the outlet of the exchanger, and at the outlet of the 3-way valve is connected to the inlet of the pump.

The third object of the invention is to provide vehicle using a lubrication circuit according to the second object of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
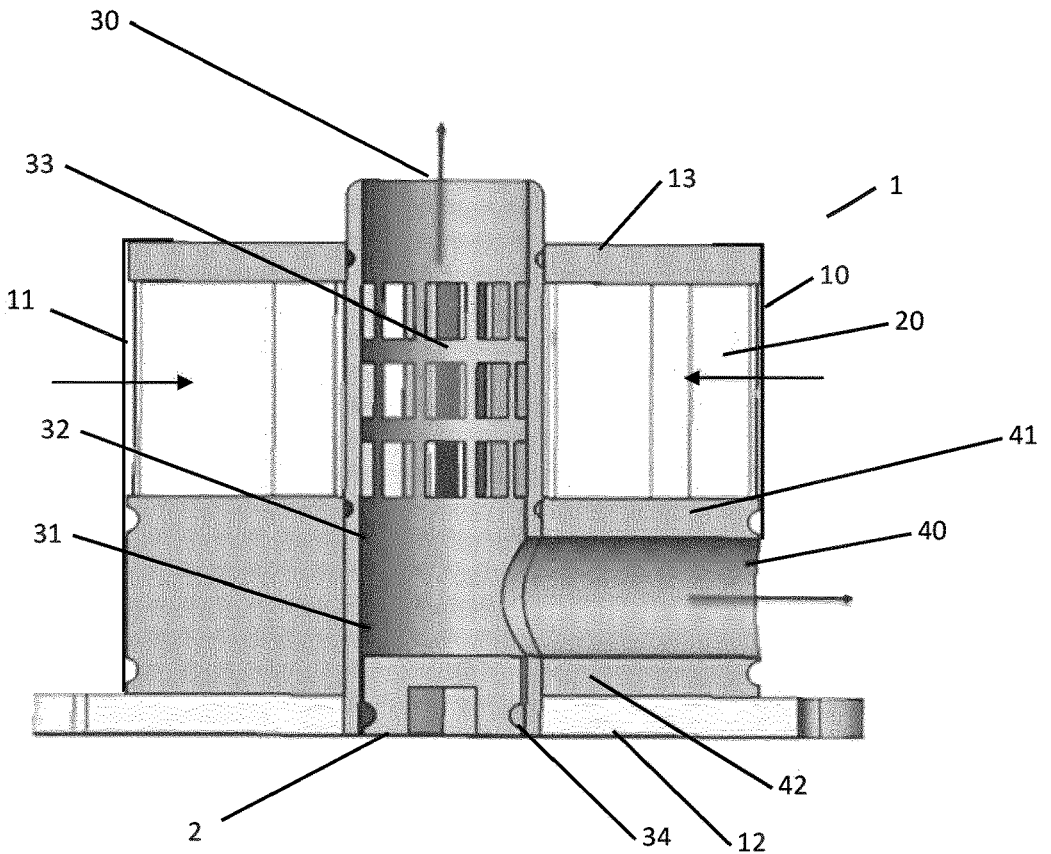
FIG. 1 is a cross-sectional view of an embodiment of the oil filter according to the invention.

The oil filter 1 according to the invention will be described with reference to FIG. 1. The oil filter 1 according to the invention comprises a housing 10 forming a cavity inside which a filter medium 20 is placed. The housing 10 comprises at least one side wall 11 between a base 12 and a top wall 13. The top wall 13 and the side wall(s) may be made in one piece. According to one embodiment, the housing 1 is cylindrical in shape. The longitudinal axis of the housing is perpendicular to the base 12 and the top wall 13.

The housing 10 comprises at least one inlet port (not shown) located upstream of the filter media 20 in the direction of oil flow through the filter. The filter also includes a first 30 and a second 40 oil outlet port. These two outlet ports 30, 40 are located downstream of the filter media 20 in the direction of oil flow in the filter 1.

According to the illustrated embodiment, the filter 1 comprises a first conduit 31, a first portion 32 of which occupies the cavity of the housing 10 and a first end of which forms the first orifice 30. The first portion 32 comprises a perforated zone 33 placed opposite the filter medium 20 in the cavity of the housing 10 so that the oil passing through the filter medium 20 can circulate to the first orifice 30. According to the illustrated embodiment, the first duct 31 is parallel to the longitudinal axis of the cylinder forming the filter housing 10. The first duct 31 may also be coaxial with the longitudinal axis of the housing 10.

According to the illustrated embodiment, the first duct 31 passes through the housing 10 of the filter 1 so that both ends open out to the outside of the filter 1. As previously indicated, the first end of the duct 31 forms the first orifice 30. The second end 34 of the first duct 31 comprises a plug 2. The plug 2 includes a seal to prevent oil leakage from the filter 1. When the plug 2 is removed, it is possible to drain the lubrication circuit of the vehicle on which the filter according to the invention is mounted.

According to the invention, the filter 1 comprises a second conduit 41, a first portion 42 of which occupies the cavity of the housing 10 and a first end of which forms the second outlet port 40 of the filter. The first portion 42 is disposed downstream of the filter medium in the direction of oil flow in the filter 1. According to one embodiment, the axis of the second port 40 is not in a direction parallel to the axis of the first port 30. According to an embodiment not shown, the second duct 41 also comprises a perforated area similar to the perforated area 33 of the first duct and also positioned opposite the filter media 20 in the housing cavity 10 so that oil passing through the filter media 20 can flow to the second port 40.

In the illustrated embodiment, the axis of the second port 40 lies in a plane perpendicular to the axis of the first port. This arrangement makes it easier to connect two components of the lubrication circuit. In particular, in order to reduce the size of the filter 1, the first conduit 21 is connected to the second conduit 41. Thus, according to the illustrated embodiment, the oil passing through the filter medium 20 passes through the first and second conduit after having passed through the perforated area 33 of the first conduit 31.

The filter medium 20 used in the filter is of a type known per se. For example, it is made of pleated paper. The shape of the filter medium 20 corresponds substantially to that of the cavity of the housing 10. According to the illustrated embodiment, the shape of the filter medium 20 is a cylindrical sleeve. The central channel of the cylindrical sleeve is occupied by the first duct 31 when the filter media is assembled in the filter housing 10.

The two outlet ports 30, 40 allow two separate components of a lubrication circuit to be connected directly to the oil filter according to the invention. This simplifies the lubrication circuit and reduces its size.

Figure 2:
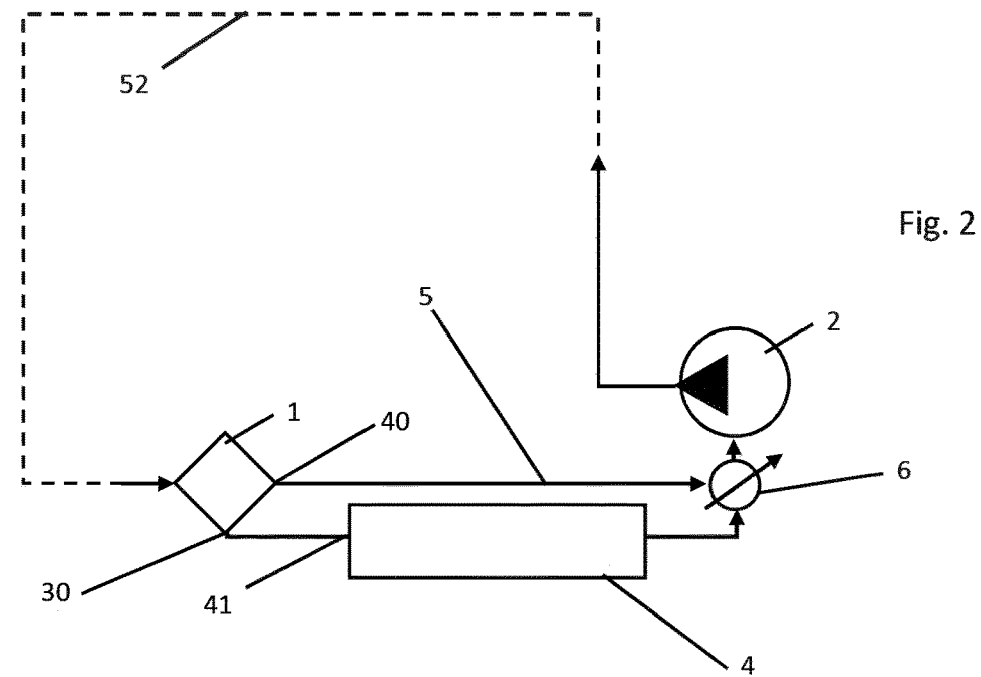
FIG. 2 shows a schematic diagram of a lubrication circuit equipped with the filter according to the invention.

An example of a lubrication circuit 52 comprising the oil filter according to the invention is shown in FIG. 2. The lubrication circuit 52 is, for example, that of a motor vehicle and more particularly the lubrication circuit of a transmission of the vehicle.

The lubrication circuit 52 comprises a pump 2 for circulating oil throughout the lubrication circuit 52. The oil filter 1 according to the invention is, for example, placed downstream of the pump 2. The lubrication circuit 52 also comprises a heat exchanger 4 for cooling the oil in the lubrication circuit, a bypass circuit 5 for the heat exchanger 4 and a three-way valve 6.

The first port 30 of the filter is for example connected to an inlet 41 of the heat exchanger 4. The outlet of the heat exchanger 4 is connected to a first inlet of the three-way valve 6. The bypass circuit 5 is connected on the one hand to the second port 40 of the filter 1 and on the other hand to a second inlet of the three-way valve. Thus, the three-way valve 6 is arranged to allow oil to flow either through the heat exchanger 4 or through the bypass circuit 5. When the oil flows through the bypass circuit 5 it is not cooled by the heat exchanger 4. The output of the three-way valve is connected to the input of the pump 2.

It is to be understood that the present invention is not limited to the embodiments described above and illustrated in the drawings; rather, the skilled person will recognize that many changes and modifications may be made within the scope of the appended claims.

The invention claimed is:

1. An oil filter for a vehicle lubrication system comprising:
   a housing having at least one side wall extending between a base and a top wall defining a cavity;
   a first conduit axially extending through the cavity defining a first outlet port at an end thereof, a first portion of the first conduit adjacent to the first outlet port defining a perforated zone;
   a second conduit laterally extending through the cavity, and being orthogonally connected with the first conduit within the cavity at an end of the second conduit, such that an interior volume of the first conduit is in fluid communication with an interior volume of the second conduit, the opposing end of the second conduit extending through the at least one side wall and defining a second outlet port;
   a filter media surrounds the perforated zone; and
   an inlet for introducing oil to be filtered upstream of the filter media;
      wherein, oil to be filtered enters the housing through the inlet, flows through the filter media, through the perforated zone, and filtered oil flows out of the housing through the first outlet port and the second outlet port.

2. The oil filter according to claim 1, wherein the housing is cylindrical.

3. The oil filter according to claim 2, wherein the axis of the first outlet port is coincident with the axis of the cylindrical housing.

4. The oil filter according to claim 1, wherein the opposing end of the first conduit is open, to facilitate drainage.

5. The oil filter according to claim 4, further comprising:
   a plug sized to sealingly close the open, opposing end of the first conduit.

6. The oil filter according to claim 5, wherein the plug includes a seal to prevent oil leakage.

7. The oil filter according to claim 1, wherein a side wall of the first conduit includes an aperture that places the interior volume of the first conduit in fluid communication with the interior volume of the second conduit.

8. A lubrication circuit of a motor vehicle comprising:
   an oil filter for a vehicle lubrication system including:
      a housing having at least one side wall extending between a base and a top wall defining a cavity;
      a first conduit axially extending through the cavity defining a first outlet port at an end thereof, a first portion of the first conduit adjacent to the first outlet port defining a perforated zone;
      a second conduit laterally extending through the cavity, and being orthogonally connected with the first conduit within the cavity at an end of the second conduit, such that an interior volume of the first conduit is in fluid communication with an interior volume of the second conduit, the opposing end of the second conduit extending through the at least one side wall and defining a second outlet port;
      a filter media surrounding the perforated zone; and
      an inlet for introducing oil to be filtered upstream of the filter media;
         wherein, oil to be filtered enters the housing through the inlet, flows through the filter media, through the perforated zone, and filtered oil flows out of the housing through the first outlet port and the second outlet port;

a pump;

a heat exchanger for cooling the oil of the lubrication circuit; and a by-pass circuit permitting bypass of the heat exchanger.

9. The lubrication circuit according to claim 8, wherein the second outlet port is fluidically connected to an inlet of the pump, and the first outlet port is fluidically connected to an inlet of the heat exchanger.

10. The lubrication circuit according to claim 8 further comprising:

a 3-way valve including:

a first inlet of the 3-way valve that is fluidically connected the second outlet port of the oil filter;

a second inlet of the 3-way valve that is fluidically connected to an outlet of the heat exchanger; and an outlet of the 3-way valve that is fluidically connected to an inlet of the pump.

* * * * *